March 19, 1929.  J. E. SIMS  1,706,327
METALLIC WHEEL
Filed Oct. 23, 1922  2 Sheets-Sheet 1

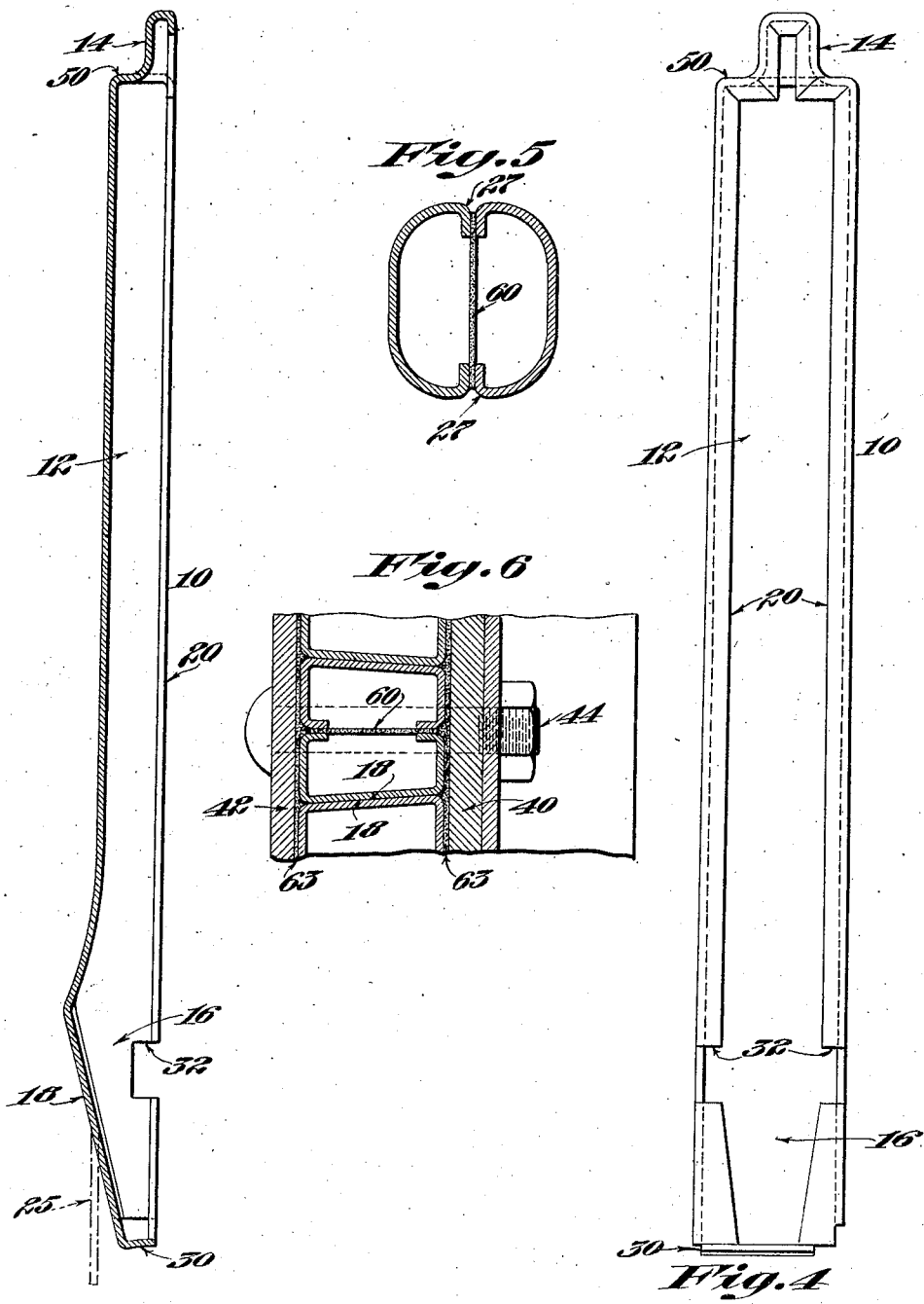

Patented Mar. 19, 1929.

1,706,327

UNITED STATES PATENT OFFICE.

JAMES E. SIMS, OF WORCESTER, MASSACHUSETTS.

METALLIC WHEEL.

Application filed October 23, 1922. Serial No. 596,208.

The present invention relates to metallic vehicle wheels.

The principal object of the present invention is to provide a new and improved form of metallic spoke which may be cheaply manufactured in volume production and which can be embodied in the standard form of artillery wheel having a metallic or pressed steel felloe without the necessity of altering or modifying the wheel.

A further object of the invention is to generally improve vehicle wheels of this type and to provide an all metallic wheel which may be manufactured cheaply and easily.

With these and other objects in view, the various features of the invention consist in certain novel features of construction, combinations and arrangements of parts hereinafter described and claimed, the advantages of which will be obvious to those skilled in the art from the following description.

Figure 1:
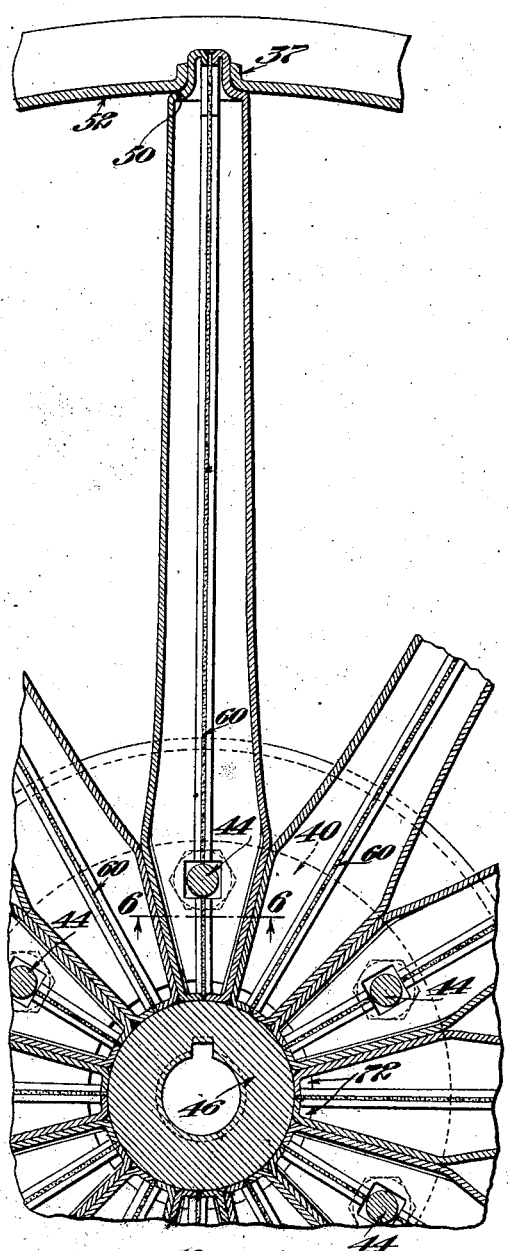
Figure 2:
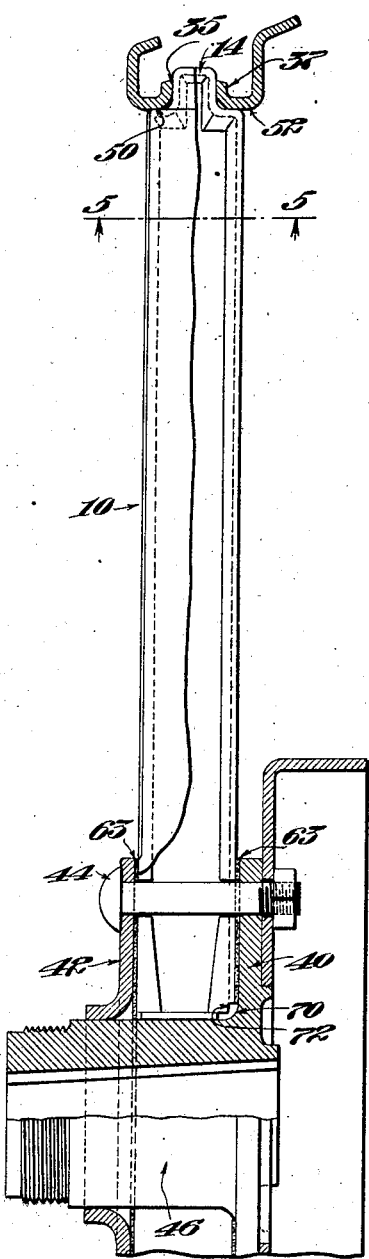

In the accompanying drawings illustrating the preferred form of the invention Fig. 1 represents a section of a portion of a vehicle wheel embodying the features of the invention; Fig. 2 is a view partly in section taken on a plane transverse to Fig. 1; Fig. 3 is a longitudinal section of one of the spoke members; Fig. 4 is a view of the same spoke member taken transversely to Fig. 3; Fig. 5 is a cross section through one of the spokes with the two half portions in assembled relation; and Fig. 6 is a section upon the line 6—6 of Fig. 1.

According to the present invention a tubular metallic spoke is made in two portions which together form a completed spoke of such a shape and size that it may be received within the usual type of artillery wheel having a pressed steel felloe and hub members in the same manner as the usual form of wooden spoke. The cooperating members constituting the completed spoke are so designed with respect to one another that the proper assembling of these members in place between the hub and felloe of the wheel locks them rigidly together and into the wheel without the necessity of employing additional means for securing the two halves of the spoke together. As will be observed from an inspection of Figs. 3 and 4, each spoke comprises two half portions indicated generally at 10. The member 10 comprises a body portion 12 terminating in a reduced end portion 14 for reception within a recess within the felloe and an enlarged tenon 16 for attachment to the hub, the tenon end being designed in such a manner that when the several parts of the spokes and the spokes themselves are assembled within the hub the opposing inclined faces 18 will abut one another in a manner to form the completed hub. Each spoke portion is provided at its open side with a flat inturned lip 20 extending about the open side of the spoke portion except at the hub ends and adapted to abut against a similar lip formed upon the cooperating spoke portion in order to stiffen the spoke and provide meeting surfaces when the two spoke portions are assembled. It will be observed from an inspection of Figs. 1 and 2 that the cooperating spoke portions are designed in such a manner that the meeting plane between the two portions when assembled is transverse to the plane of the wheel and that furthermore the depth of the completed spoke in a plane transverse to the plane of the wheel is uniform from the felloe to the extreme hub end of the spoke, as indicated clearly in Fig. 2. On the other hand, the cross section of the spoke in the plane of the wheel is not only varied and tapered to form the tenon end but in addition the width of the spoke progressively increases from the felloe toward the hub. By producing a spoke in this manner having a varying cross section in the plane of the wheel and a substantially uniform depth in a plane normal thereto, the production of the spoke portions is simplified and made easier.

In manufacturing the spoke a sheet of metal is first drawn into substantially the shape shown in Figs. 3 and 4 without the inturned lip 20. Thereafter a tongue piece indicated at 25 is partially separated from the spoke at the tenon end upon parallel longitudinal lines and bent downwardly into parallelism with the main body portion 12 of the spoke member, as indicated in dot and dash lines in Fig. 3. With the tongue portion 25 bent down as indicated a solid mandrel may be inserted from the tenon end and the inturned flange or lip 20 produced over the mandrel. The dies for the production of this flange or lip may either form a sharp corner between the lip and tubular portion or a slightly rounded corner, as indicated at 27 in Fig. 5. After the inturned flange has been formed the mandrel is withdrawn and the spoke member subjected to a further operation in which the tongue portion is returned to the position shown in full lines and the curved flange 30 is turned up at the hub end. During the blanking operation the hub end of the spoke is notched, as indicated at 32, to form an opening for the reception of the through-bolt securing the hub flanges together. The withdrawal of the solid mandrel from the interior of the spoke is facilitated by slightly tapering the spoke in a plane transverse to the plane of the wheel in addition to the taper of the spoke in the plane of the wheel, as shown in Fig. 1. It will be observed that with this construction the entire formation of the spoke portion is accomplished by a series of relatively simple drawing and bending operations without the necessity of machining or similar expensive work.

Two spoke portions cooperate, as indicated in Figs. 1 and 2, to form the completed spoke, the reduced ends 14 of the spoke portions entering a recess 35 formed in a rolled steel felloe, the recess being surrounded by an upstanding annular flange 37 to provide a bearing for the spoke end. With a series of spokes assembled and having their reduced ends received within the metallic felloe, the opposite tenon ends abut one another and cooperate to form a completed hub. These tenon ends are enclosed between hub flanges indicated at 40 and 42 which are drawn together by through-bolts 44 to clamp the spoke ends rigidly therebetween. As shown in Fig. 2, the hub flange 40 has an integral hub portion 46 projecting therefrom which slidingly receives the cooperating flange 42 in the usual manner.

In order to provide for a rigid locking of the spoke ends within the hub and to permanently maintain the portions of the spokes in engagement means are provided for exerting a wedging action upon the spoke ends when the hub flanges are forced together. For this purpose in the illustrated embodiment of the invention the cooperating spoke sections are provided with a slight taper in opposite directions. This tapering of the spoke ends transversely of the plane of the wheel not only permits the hub ends of the spokes to be rigidly locked in place but in addition facilitates the assembling of the spokes in the felloe and hub of the wheel. As indicated in Fig. 6, one spoke section has an approximate three degree taper to the left and the cooperating section has a similar taper in the opposite direction, this section abutting against one section of the next succeeding spoke. By slightly tapering the opposite faces of the hub ends of the spokes in this manner, a pressure upon the hub flanges tending to draw them together rigidly forces the various spoke portions against one another and prevents any play or looseness in the hub.

In addition the taper of the hub end of the spoke in the direction of the length of the spoke causes the individual spokes to be forced home in the felloe so that the shoulders 50 abut against the inner periphery 52 of the felloe. With this construction it will be observed that the various spoke sections may be made comparatively simply and inexpensively and assembled with a standard form of felloe and hub without changing the latter. The assembly of the spokes within the hub and felloe presents no practical difficulties and causes the spoke portions themselves to be locked rigidly together without the necessity of additional securing means. In order to prevent the entrance of moisture or dirt between the spoke sections it has been found desirable to interpose a thin gasket 60 of shellacked paper or similar material, which engages with the meeting faces of the spoke portions, as indicated clearly in Fig. 5, and effectually seals the meeting face in a manner to prevent the entrance of moisture either around the sides or end of the spoke. As indicated in the drawings, this sealing gasket may be cut to the proper size and readily inserted when the spoke portions are assembled without affecting the exterior appearance of the wheel. In addition to the gasket inserted between the individual spoke sections, it may be desirable to provide additional gaskets 63 which are inserted between the hub flanges and the outer faces of the hub ends, this gasket serving to prevent the entrance of moisture between the flanges and the spokes locked therebetween. It will be observed from an inspection of Fig. 1 that the inturned ends 30 of the spoke sections developed along the curvature of the hub rest against the periphery of the hub 46 and form a rigid bearing for the transmission of radial strains. In order to afford clearance for the radius 70 between the flange 40 and the hub 46, the spoke portions may be conveniently notched, as indicated at 72, so that when assembled in position ample clearance is afforded, as indicated in Fig. 2.

This form of spoke when assembled within a completed wheel and properly painted or enameled produces a wheel of artistic appearance which is not ordinarily distinguishable from the ordinary type of wooden artillery wheel, the proper coating of the spokes with enamel serving to obliterate the junction between the two halves of the spokes. Aside from its appearance, however, this new form of wheel lends itself admirably to volume production and is actually stronger and practically no heavier than the conventional type of wooden wheel. Furthermore the product is uniform and free from the defects incident to the ordinary type of wheel.

I claim:

1. A metallic wheel comprising a plurality of spokes each consisting of two separate and opposed spoke portions meeting in a plane at an angle to the plane of the wheel, the spoke portions having inturned lips which abut one another, and means exterior to the spokes for rigidly maintaining the spoke portions in assembled relation.

2. A metallic vehicle wheel comprising a plurality of spokes each having a pressed metal spoke portion of trough-shaped cross section having an inturned flange surrounding the open side of the spoke portion, two of these spoke portions combining to form a completed spoke and meeting in a plane at an angle to the plane of the wheel, a relatively thin gasket of water-proof material interposed between the two spoke portions and abutting against the inturned flanges, and means for maintaining the metal spoke portions in assembled relation.

3. A vehicle wheel comprising a felloe member, a plurality of hollow metallic spokes each consisting of two separate and opposed spoke portions meeting in a plane at an angle to the plane of the wheel, each pair of complementary spoke portions tapering in opposite directions, and hub members for wedging the spoke portions together by virtue of the tapered faces.

JAMES E. SIMS.